United States Patent
Tanizawa

(10) Patent No.: US 8,840,169 B2
(45) Date of Patent: Sep. 23, 2014

(54) DOOR TRIM

(75) Inventor: Toshiya Tanizawa, Aichi-ken (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 0 days.

(21) Appl. No.: 14/232,964

(22) PCT Filed: Jul. 9, 2012

(86) PCT No.: PCT/JP2012/067451
§ 371 (c)(1),
(2), (4) Date: Jan. 15, 2014

(87) PCT Pub. No.: WO2013/018510
PCT Pub. Date: Feb. 7, 2013

(65) Prior Publication Data
US 2014/0152049 A1    Jun. 5, 2014

(30) Foreign Application Priority Data

Aug. 2, 2011    (JP) ................................. 2011-169166

(51) Int. Cl.
*B60J 5/00* (2006.01)
*B60J 5/04* (2006.01)
*B60R 13/02* (2006.01)

(52) U.S. Cl.
CPC ............. *B60J 5/0416* (2013.01); *B60J 5/042* (2013.01); *B60R 13/0206* (2013.01); *B60R 2013/0293* (2013.01); *B60R 13/0243* (2013.01)
USPC .................................................... 296/146.7

(58) Field of Classification Search
CPC ................................. B60J 5/0146; B60J 5/042
USPC .............................................. 296/146.6, 146.7
See application file for complete search history.

(56) References Cited

U.S. PATENT DOCUMENTS

| 6,929,309 | B1 * | 8/2005 | Radu et al. | 296/146.7 |
| 7,788,853 | B2 * | 9/2010 | Narimatsu et al. | 49/502 |
| 2010/0187855 | A1 * | 7/2010 | Kitajima et al. | 296/146.7 |
| 2013/0033066 | A1 | 2/2013 | Tanizawa | |

FOREIGN PATENT DOCUMENTS

| JP | 2001-55095 | 2/2001 |
| JP | 2004-210177 | 7/2004 |
| JP | 2007-190959 | 8/2007 |
| JP | 2009-173244 | 8/2009 |
| JP | 2009-269576 | 11/2009 |

OTHER PUBLICATIONS

International Search Report of PCT/JP2012/067451 dated Sep. 11, 2012.

* cited by examiner

*Primary Examiner* — Lori Lyjak
(74) *Attorney, Agent, or Firm* — Greenblum & Bernstein, P.L.C.

(57) ABSTRACT

A door trim according to this invention includes a front trim and a rear trim. The front trim is to be arranged closer to a front side of a vehicle. The rear trim is to be arranged closer to a rear side of the vehicle. The door grip includes a first divided section included in the front trim and a second divided section included in the rear trim assembled together. With this configuration, the door grip can be formed using parts of the front trim and the rear trim while the front trim and the rear trim are provided for forming other part of the door trim. Therefore, the number of components can be reduced. In addition, dies and steps of forming the door grip are not required and thus the production efficiency is improved.

13 Claims, 9 Drawing Sheets

DOOR TRIM

TECHNICAL FIELD

The present invention relates to a door trim including a door grip.

BACKGROUND

Conventionally, a door trim including a door grip disclosed in Patent Document 1 is known. The door trim includes a door grip provided as a separate part from a door trim body. The door grip is mounted to the door trim body that covers a vehicle-interior-side surface of a vehicle door. The door grip includes trim mounting bosses at an upper end and a lower end thereof and upper and lower attachment bosses. Each trim mounting boss is fixed to the door trim body. The upper and lower attachment bosses are passed through the door trim body and fixed to a vehicle body panel. By fixing these bosses to the door trim body or the vehicle body panel with screws, the door grip is mounted to the door trim body or the vehicle body panel. A predetermined level of mount strength is ensured between the door grip and the door trim body or the vehicle body panel such that the door grip can withstand an opening operation and a closing operation of the door by an occupant.

RELATED ART DOCUMENT

Patent Document

Patent Document 1: Japanese Unexamined Patent Publication No. 2004-210177

Problem to be Solved by the Invention

However, the door grip having such a configuration is assembled from components different from the door trim body. An improvement is considered in terms of the number of dies for forming the components and the number of components. In addition, the door grip needs to be fixed to the door trim body and the vehicle body panel at several points to ensure predetermined level of mount strength as mentioned above. Therefore, a great deal of time is required for mounting the door grip. An improvement in production efficiency related to forming and mounting of the door grip with a reduced number of components is expected.

DISCLOSURE OF THE INVENTION

The present invention has been made in view of the aforementioned circumstances, and it is an object of the invention to provide a door trim including a door grip for which a reduction in the number of components and improvement in the production efficiency are possible.

Means for Solving the Problem

According to this invention, a door trim including a door grip includes a front trim to be arranged closer to a front side of a vehicle and a rear trim to be arranged closer to a rear side of the vehicle. The door grip includes a first divided section included in the front trim and a second divided section included in the rear trim assembled together.

With this configuration, the door grip can be formed using a part of each of the front trim and the rear trim while the front trim and the rear trim are provided for forming other part of the door trim. Therefore, the number of the components can be reduced. Accordingly, exclusive dies for and exclusive steps of forming the door grip are not required and thus the production efficiency is improved. Further, since the part of each of the front trim and the rear trim constitutes the door grip, steps of mounting the door grip to the trims may be omitted and thus the production efficiency is further improved.

The front trim may further include a mount section for mounting a vehicle rear end potion of the front trim to a mounting section arranged in a vehicle front end portion of the rear trim with the mount section and the mounting section overlapping each other. The mount section may include the first divided section. The mounting section may include the second divided section. The door grip may be arranged in a boundary portion between the front trim and the rear trim.

With this configuration, the door grip can be configured by the mount section and the mounting section that are provided for assembling the front trim and the rear trim. Further, the assembling of the front trim to the rear trim and the assembling of the first divided section to the second divided section can be performed with a common structure, and thus the configuration is simplified. Accordingly, the structure of dies for forming the trims and steps of assembling the trims can be simplified, and thus the production efficiency is improved. In addition, since the door grip is arranged in the boundary portion between the front trim and the rear trim, the door trim including the door grip that extends along a dividing line between the trims and is excellent in design is obtained.

Either one of the first divided section and the second divided section may arranged on an interior side of the vehicle and the other one of the first divided section and the second divided section may be arranged on an exterior side of the vehicle. The door grip may be formed by assembling the divided sections including the first divided section and the second divided section.

With this configuration, a surface of one of the first divided section and the second divided section receives an external force directed to the vehicle interior side that is caused when an occupant grips the door grip. Therefore, the door grip having great strength can be obtained. In addition, the dividing line that is a boundary between the first divided section and the second divided section is located in an area that is less likely to be viewed from the vehicle-interior-side surface of the door trim that is a design surface, and this improves appearance of the door trim.

The one of the first divided section and the second divided section arranged on the interior side of the vehicle may include a boss projecting toward a body of the vehicle. The other one of the first divided section and the second divided section arranged on the exterior side of the vehicle may have a through hole through which the boss is passed. The boss passed through the through hole may be fixed to the body of the vehicle.

With this configuration, the door grip including the first divided section and the second divided section is mounted to a vehicular body with a simple structure. Such a mounting structure is not exposed to a design-surface side, and this improves appearance of the door trim.

The one of the first divided section and the second divided section arranged on the interior side of the vehicle may further include a grip cover attached to an interior side surface of the one of the first divided section and the second divided section arranged on the interior side. The grip cover that is a separate member is used as a designed portion of the door grip. Accordingly, even if the door grip is formed by the paired divided sections, the boundary between the divided sections or the attachment portion of the door grip to the vehicle body is covered with the grip cover from the vehicle interior side. This enhances the design of the door trim.

An ornament may be attached to the front trim and the rear trim and arranged on the exterior side relative to the first divided section and the second divided section.

The door grip is formed by the first divided section that is included in the front trim as a part thereof and the second divided section that is included in the rear trim as a part thereof. The door grip is divided into a vehicle interior section and a vehicle exterior section. Furthermore, each of the divided sections of the door grip is integrally molded with each of the front trim and the rear trim such that the die for molding each of the front trim and the rear trim is removed in a vehicle interior-exterior direction. Thus obtained door trim has a hole on the vehicle exterior side relative to the door grip. In other words, a member that covers the hole formed in the door trim and on the vehicle exterior side relative to the door grip cannot be molded with the front trim or the rear trim. The hole is covered with the ornament that is an existing component. Therefore, the number of components is not necessary to be increased and an appearance of the door trim is enhanced.

Advantageous Effect of the Invention

According to this invention, a door trim having a door grip capable of reducing the number of components and improving the production efficiency is provided.

MODES FOR CARRYING OUT THE INVENTION

<Embodiment>

An embodiment of the present invention will be described with reference to FIGS. 1 to 9.

A door trim 10 according to this embodiment is a vehicular interior part mounted on a vehicle interior side of a door inner panel (or a vehicle body), which is not illustrated, and constitutes a vehicle door. The door trim 10 includes a door grip 20 having a handle-like shape. The door grip 20 is provided in about a middle portion of the door trim 10 in a front-rear direction of a vehicle. In the following description, the left-right direction in FIG. 1 corresponds to the (vehicle) front-rear direction and a direction perpendicular to the plane of FIG. 1 corresponds to a width direction of the vehicle (a vehicle interior-exterior direction).

Figure 1:
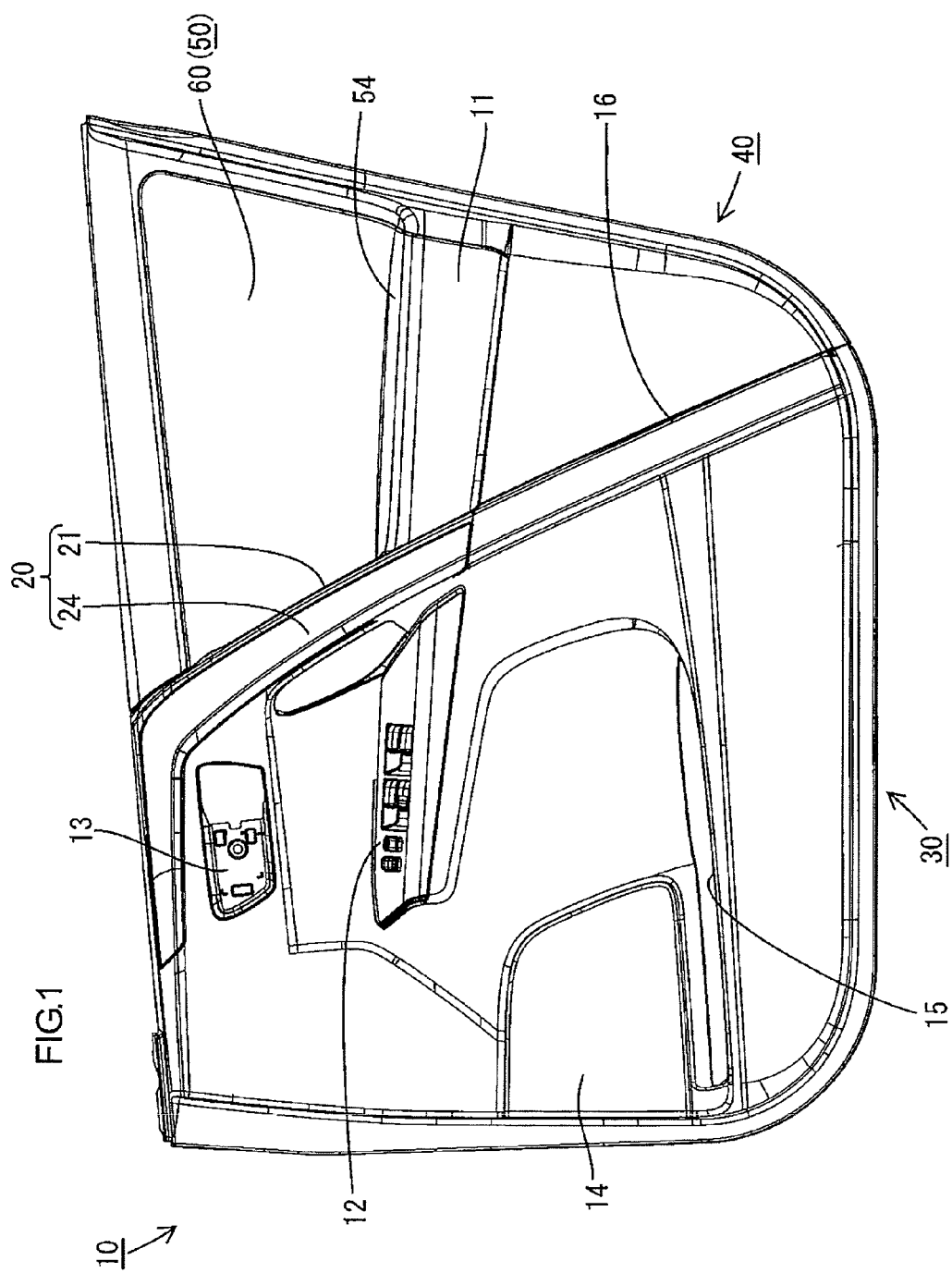
FIG. 1 is a plan view of a door trim according to an embodiment of the present invention viewed from an interior side of a vehicle.

The door trim 10 includes three main components: a front trim 30; a rear trim 40; and an ornament 50. Bases of these components are made of synthetic resin such as polypropylene or mixture of synthetic resin material and wood-based material such as kenaf. As illustrated in FIG. 1, the door trim 10 made of the above components includes an armrest 11 projecting to the vehicle interior side and extending over the front-rear direction of the vehicle. The armrest 11 has a switch panel mounting section 12A in a front portion of the armrest 11 (see FIG. 2). The switch panel mounting section 12A has a hole and a switch panel 12 is fitted therein. An inside handle mounting section 13 is arranged above the switch panel 12. An inside handle is to be attached to the inside handle mounting section 13. A speaker grill 14 and a door pocket portion 15 are arranged below the switch panel 12. The door pocket portion 15 defines a vehicle interior side portion of a door pocket.

When the front trim 30 and the rear trim 40 are assembled together, a dividing line 16 (corresponding to a boundary portion) is created on a vehicle interior side of the door trim 10. The dividing line 16 has a substantially straight and inclined line that extends from a midpoint of an upper portion of the door trim 10 in the vehicle front-rear direction to a rear portion of a lower portion of the door trim 10 in the vehicle front-rear direction. By providing the bases of the front trim 30 and the rear trim 40 in different colors (not illustrated), a portion in front of the dividing line 16 and a portion of the door trim 10 in the rear of the dividing line 16 have a highly designed appearance having different colors on a front side and a rear side thereof divided by the dividing line 16.

In the upper portion of the door trim 10, the door grip 20 is integrally provided with the front trim 30 and the rear trim 40 along the dividing line 16. The door grip 20 extends over about a middle portion of the armrest 11 in the vehicle front-rear direction. The door grip 20 includes a grip base 21 and a grip cover 24. The grip cover 24 is attached to a vehicle interior side of the grip base 21. The ornament 50 is attached to an upper portion of a vehicle rear side of the armrest 11. The ornament 50 is placed so as to cover a vehicle exterior side of the door grip 20. A skin 60 covers a vehicle interior side of the ornament 50. A material of the skin 60 may be selected from (synthetic) resin, (synthetic) leather, and textile as appropriate.

Next, each component will be described.

Figure 2:
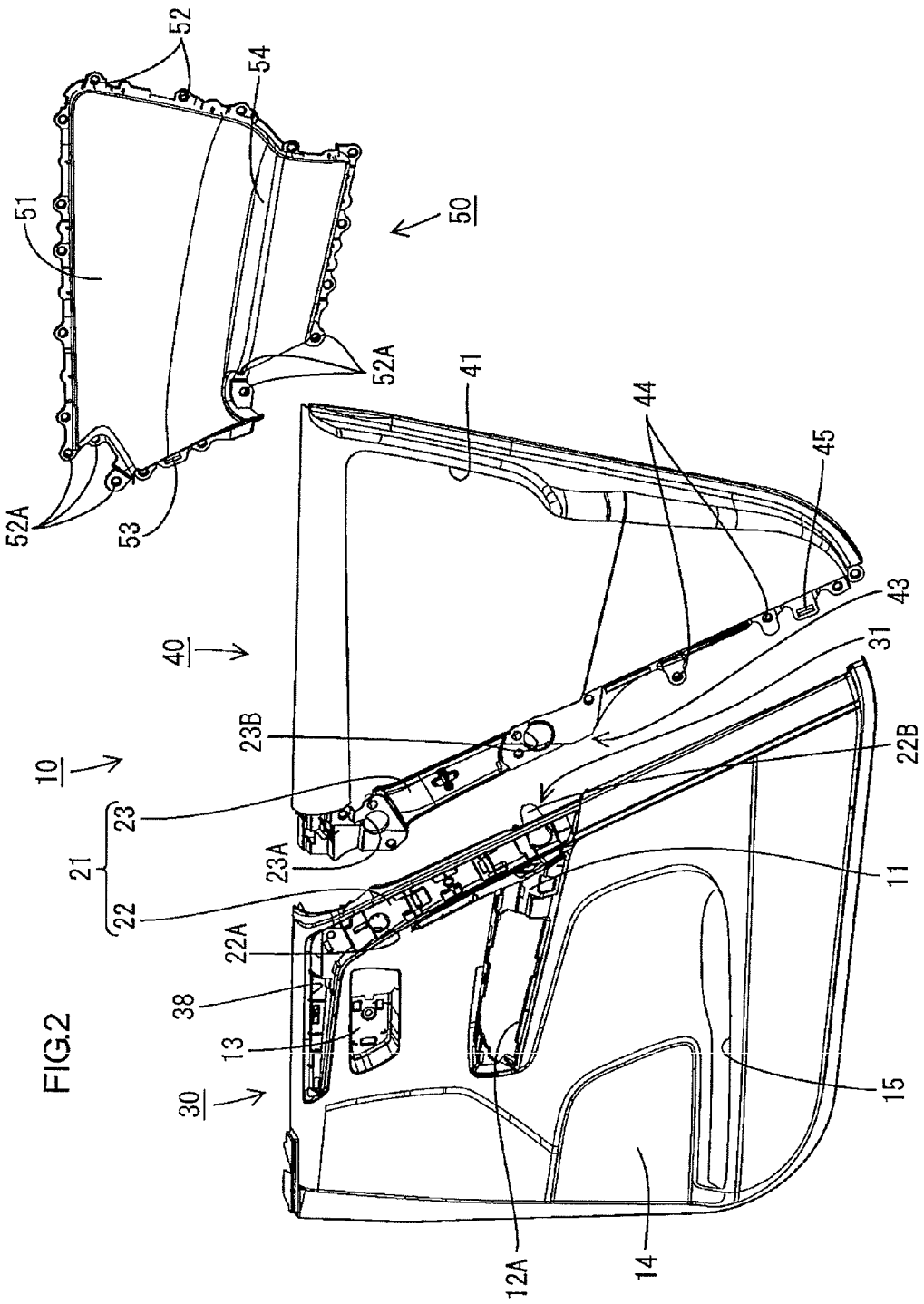
FIG. 2 is an exploded perspective view of a main portion of the door trim.
Figure 3:
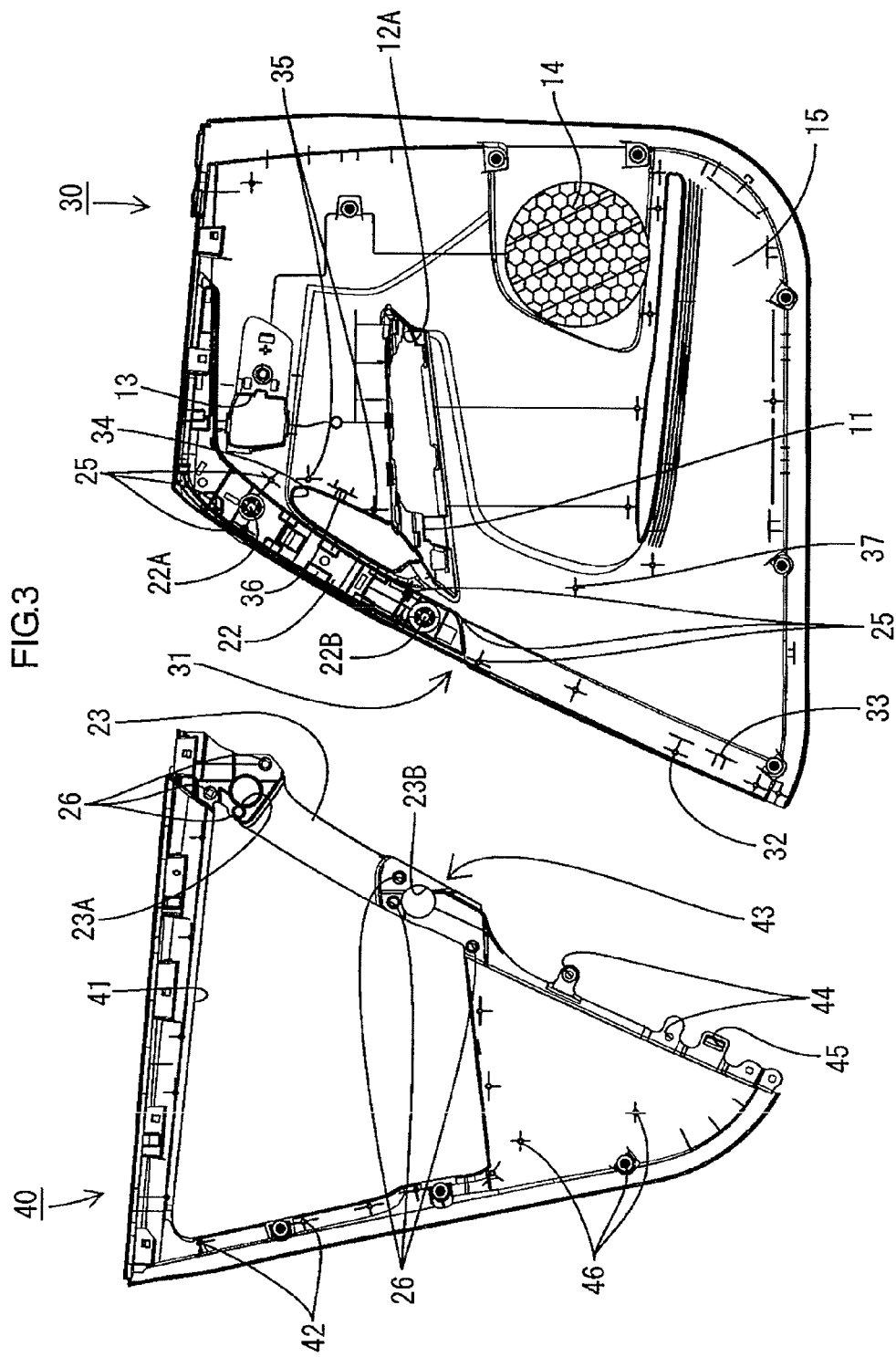
FIG. 3 is a plan view of a front trim and a rear trim included in the door trim viewed from an exterior side of the vehicle.

As illustrated in FIG. 2, the front trim 30 constitutes a vehicle front portion of the door trim 10. The front trim 30 has a mount section 31 at a rear end portion thereof. The mount section 31 is a section that corresponds to a mounting section 43 of the rear trim 40, which will be described later. The mounting section 43 and the mount section 31 are attached together so as to overlap each other in the vehicle width direction. Specifically, the mount section 31 includes round post-shaped fixing members 32 and other fixing members such as a plate-shaped lock 33. The fixing members 32 project from a surface of the mount section 31 on the vehicle exterior side.

A portion of the mount section 31 located above the armrest 11 is a first divided section 22 having a band-like shape. The first divided section 22 constitutes a vehicle interior side of the door grip base 21 of the door grip 20. The first divided section 22 and a second divided section 23 of the rear trim 40, which will be described later, are paired divided sections. When the paired divided sections are assembled, the door grip base 21 is provided as a hollow part. A hole 34 is provided in the front trim 30 on a vehicle front side of the first divided section 22 to form the first divided section 22 into the handle-like shape. Front ornament fixing portions 35 and an ornament latch 36 are arranged at an edge portion of the hole 34 on the vehicle front side. The front ornament fixing portions 35 and the ornament latch 36 have similar configurations as the fixing members 32 and the latch 33, respectively.

The rear trim 40 constitutes a vehicle rear portion of the door trim 10. The rear trim 40 has a mounting hole 41 in an upper area thereof for attaching the ornament 50 to the rear trim 40 from the vehicle exterior side. Round post-shaped rear ornament fixing members 42 project along a peripheral portion of the mounting hole 41.

A front end of the rear trim 40 is the mounting section 43. The mounting section 43 and the mount section 31 of the front trim 30 are attached together so as to overlap each other. The mounting section 43 has insertion holes 44 and a lock hole 45 in areas corresponding to the fixing members 32 and the lock 33 of the mount section 31, respectively. The band-shaped second divided section 23 is arranged in an area of the mounting section 43 beside the hole 34. The second divided section 23 constitutes a vehicle exterior portion of the grip base 21 of the door grip 20.

Figure 4:
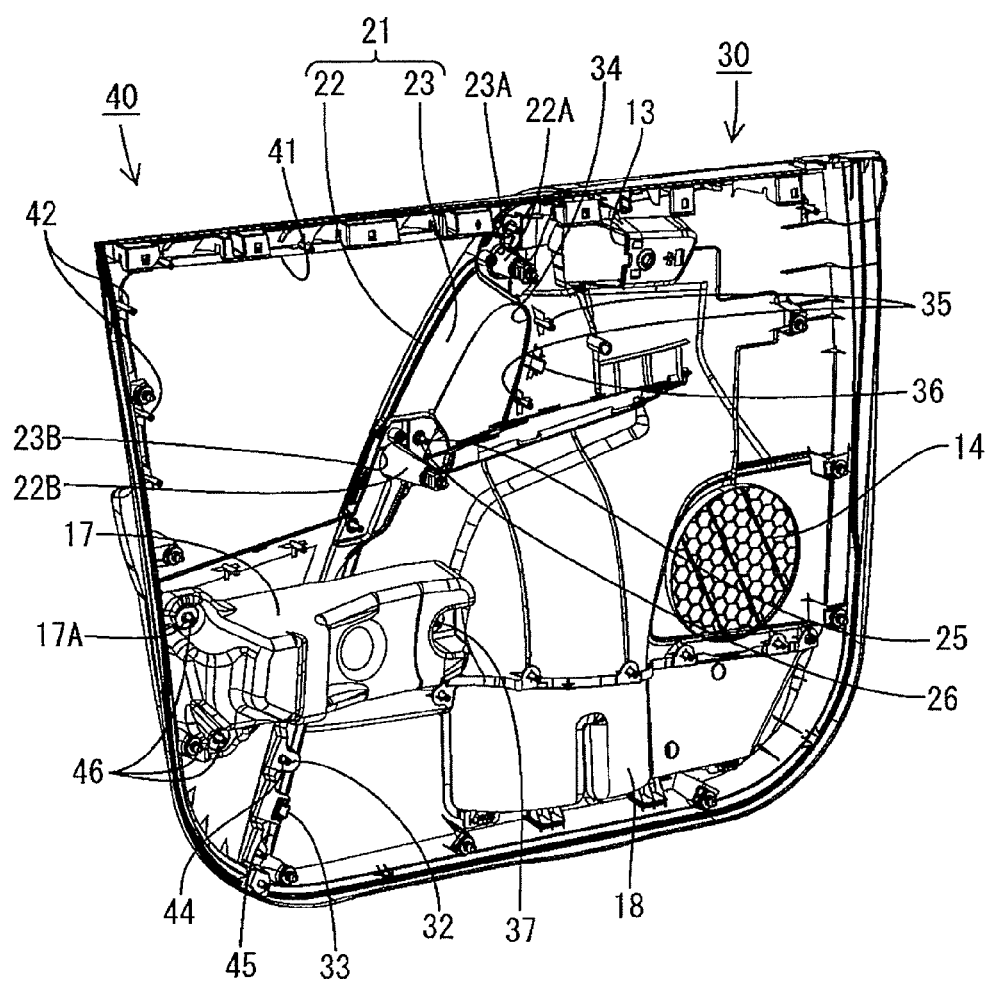
FIG. 4 is a perspective view of the front trim and the rear trim assembled together and viewed from the exterior side of the vehicle.

FIG. 4 illustrates the front trim 30 and the rear trim 40 that is attached to the front trim 30. The mounting structure around the door grip 20 will be described later in detail. The fixing members 32 of the front trim 30 are inserted in the insertion holes 44 of the rear trim 40. The lock 33 is fitted in the lock hole 45. As a result, the mount section 31 and the mounting section 43 overlap each other. After the fixing members 32 are inserted in the insertion holes 44, tips of the fixing members 32 are welded by ultrasonic welding or some other welding method. As a result, the mounting section 43 of the rear trim 40 is fixed to the mount section 31 of the front trim 30.

Figure 5:
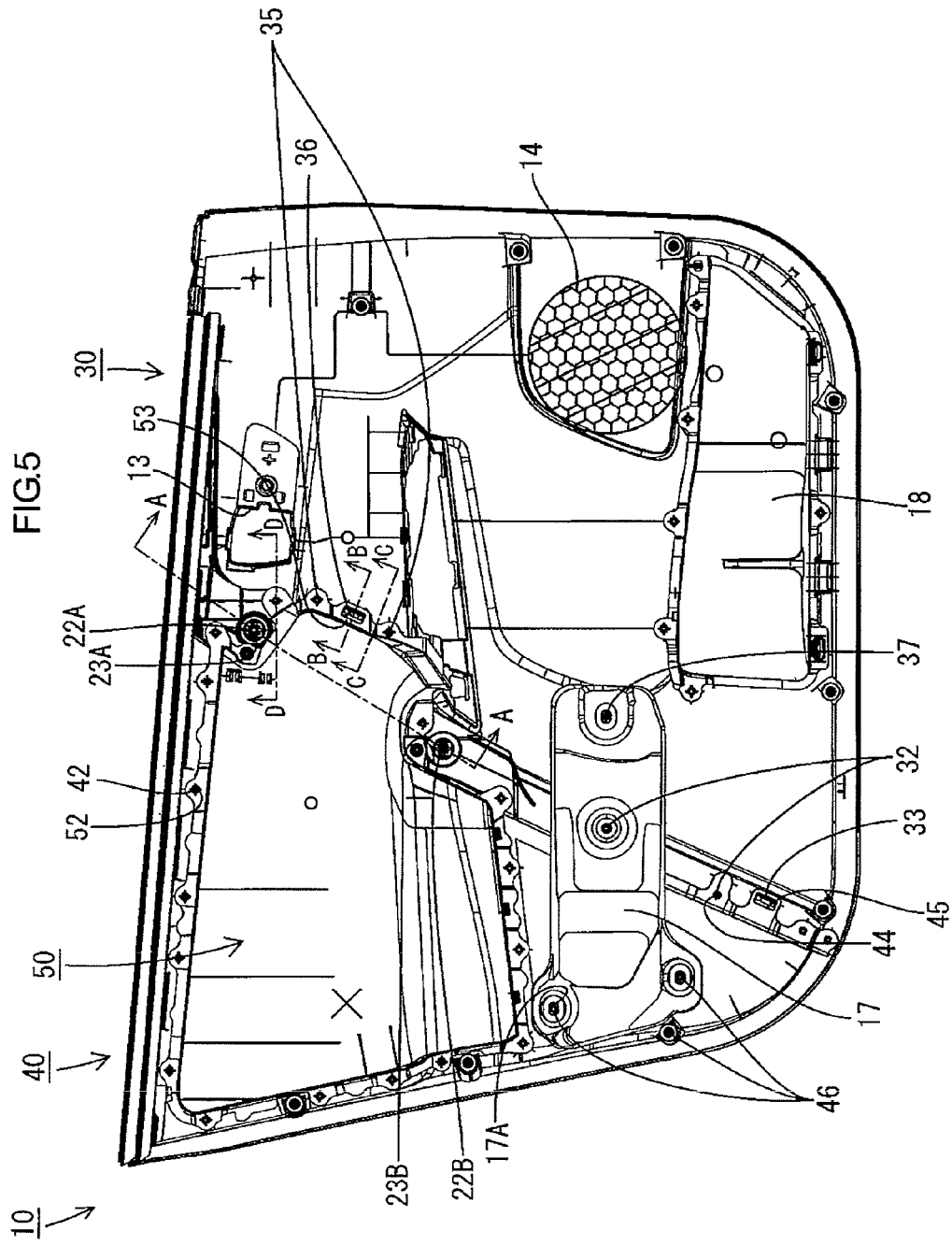
FIG. 5 is a plan view of the door trim viewed from the exterior side of the vehicle.

As illustrated in FIGS. 4 and 5, an impact absorber 17 and a pocket base 18 are mounted to vehicle-exterior-side surfaces of the front trim 30 and rear trim 40 that are fixed together. The impact absorber 17 is an energy absorbing (EA) pad provided by forming rigid polyurethane foam into a block-like shape. The impact absorber 17 is mounted so as to extend over the front trim 30 and the rear trim 40. The impact absorber 17 has through holes 17A. The trims 30 and 40 include impact absorber fixing portions 37 and 46, respectively. The impact absorber fixing portions 37 and 46 each have a round post-like shape similar to the fixing members 32. The fixing members 32 of the front trim 30 and the impact absorber fixing portions 37 and 46 of the trims 30 and 40 are inserted in the through holes 17A. Then, tips of the fixing members 32, 37, 46 are welded by ultrasonic welding or some other welding method. With the above fixing method, the impact absorber 17 is fixed to the trims 30 and 40. The pocket base 18 is made of the same synthetic resin as the trims 30 and 40 are attached so as to cover the door pocket portion 15 from the vehicle exterior side. As a result, a door pocket opens to the vehicle interior side is formed.

As illustrated in FIG. 2, the ornament 50 includes a main body 51 and a flange. The main body 51 has a plate-like shape. The flange extends outwardly from edges of the main body 51 and has ornament insertion holes 52 and an ornament lock hole 53. The ornament insertion holes 52 located corresponding to base portions 20B of the door grip 20 are first overlapping insertion holes 52A. The base portions 20 will be described later. A vehicle interior side of the main body 51 is covered with the skin 60 (see FIG. 5) and the ornament 50 is mounted to the front trim 30 and the rear trim 40 from the vehicle exterior side. Specifically, the front ornament fixing portions 35 of the front trim 30 are passed through the corresponding ornament insertion holes 52. The ornament latch 36 of the front trim 30 is fitted in the ornament latch hole 53. The rear ornament fixing portions 42 of the rear trim 40 are passed through the corresponding ornament insertion holes 52. Overlapping fixing portions 25 projecting from the first divided section 22 are passed through second overlapping insertion holes 26 of the second divided section 23. Then, overlapping fixing portions 25 are passed through the first overlapping insertion holes 52A of the ornament 50. The overlapping fixing portions 25 and the second overlapping insertion holes 26 will be described detail later.

The ornament fixing portions 35 and 42 and the overlapping fixing portions 25 are passed through the corresponding ornament insertion holes 52 and the first overlapping insertion holes 52A. After that, similar to the fixing members 32, tips of the ornament fixing portions 35 and 42 and the overlapping fixing portions 25 are welded by ultrasonic welding or some other welding method. As a result, the ornament 50 is fixed to the front trim 30 and the rear trim 40. Edges of the skin 60 are sandwiched and held between the ornament 50 and the front trim 30 or the rear trim 40 when the ornament 50 is attached to the front trim 30 and the rear trim 40.

The ornament 50 attached to the trims 30 and 40 is located on the vehicle exterior side of the door grip 20. In other words, a portion of the ornament 50 covers the hole 34 of the front trim 30 from the vehicle exterior side while the ornament 50 constitutes a surface opposite the vehicle exterior side of the door grip 30. A portion of the ornament 50, which continues from the above portion, is fitted in the mounting hole 41 of the rear trim 40. As a result, the ornament 50 and the skin 60 that covers the vehicle interior side surface of the ornament 50 constitute a design surface of the door trim 10. The main body 51 of the ornament 50 has a step protruding to the vehicle interior side. An upper surface of the step (a vehicle ceiling side) is an arm resting surface 54 of the armrest 11, which is used as an armrest for an occupant.

Figure 6:
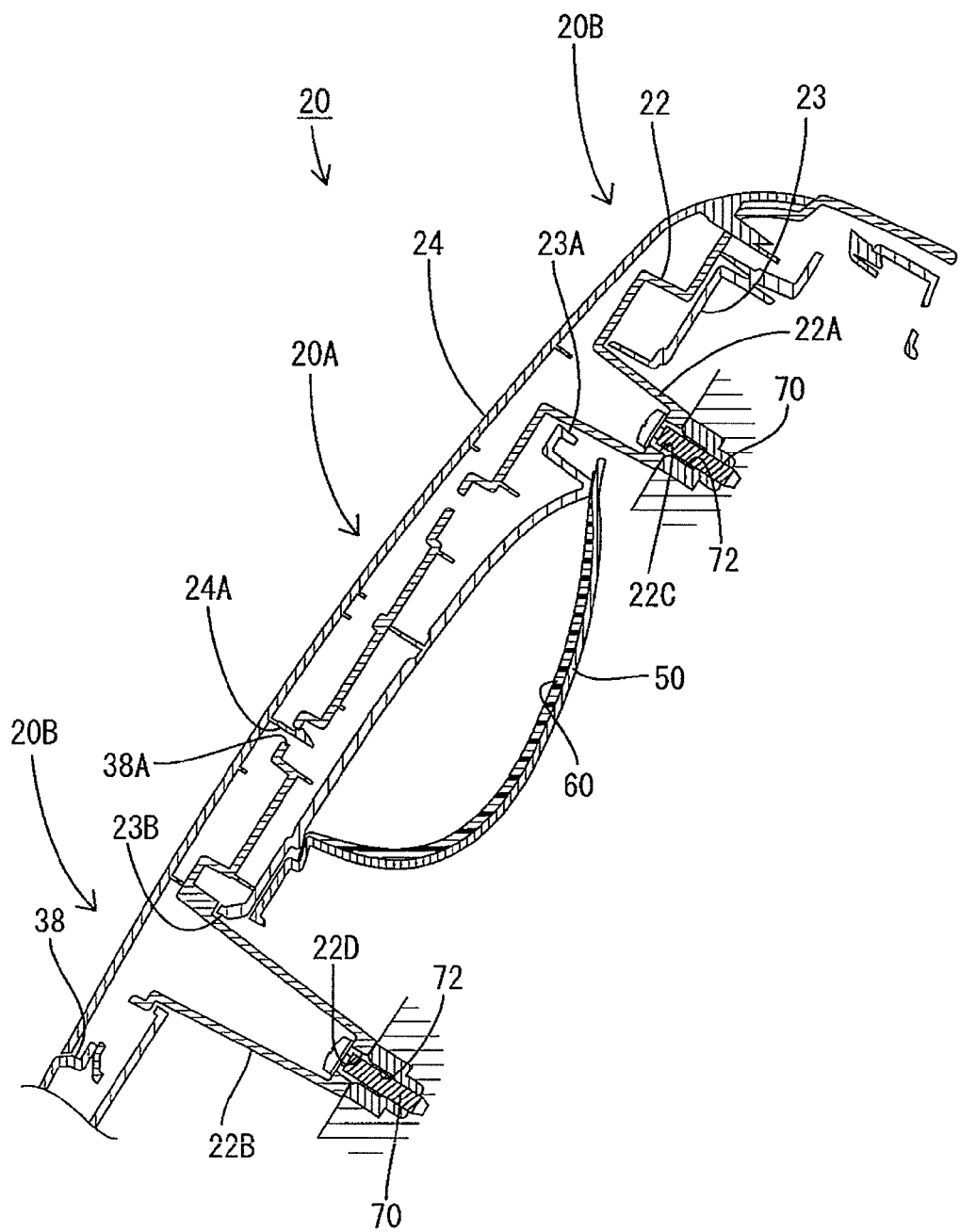
FIG. 6 is a cross-sectional view taken along line A-A in FIG. 5.

Next, the configuration of the door grip 20 and the mounting structure around the door grip 20 will be described in detail with reference to FIGS. 6 to 9. As illustrated in FIG. 6, the door grip 20 includes a grip portion 20A and the base portions 20B. An occupant can hold the grip portion 20A from the vehicle interior side. The base portions 20B are located at the ends of the grip portion 20A and constitute bases of the door grip 20. The first divided section 22 includes an upper mounting boss 22A and a lower mounting boss 22B in the base portions 20B, respectively. The upper mounting boss 22A and the lower mounting boss 22B project to the vehicle exterior side so as to narrow toward distal ends thereof. The mounting bosses 22A and 22B have screw holes 22C and 22D at distal ends thereof, respectively, and a screw 70 is inserted in each of the screw holes 22C and 22D. Around the mounting bosses 22A and 22B, the overlapping fixing portions 25 formed in a round post-like shape are arranged. The overlapping fixing portions 25 have similar configurations as the fixing members 32.

The second divided section 23 has an upper through hole 23A and a lower through hole 23B in areas corresponding to the upper mounting boss 22A and the lower mounting boss 22B, respectively. The upper through hole 23A and the lower through hole 23B each have a round shape and the upper mounting boss 22A and the lower mounting boss 22B are inserted in the upper through hole 23A and the lower through hole 23B, respectively. Further, the second divided section 23 has the second overlapping insertion holes 26 in areas around the through holes 23A and 23B of the second divided section 23 so as to correspond to the overlapping fixing portions 25. The overlapping fixing portions 25 are inserted in the second overlapping insertion holes 26.

Figure 7:
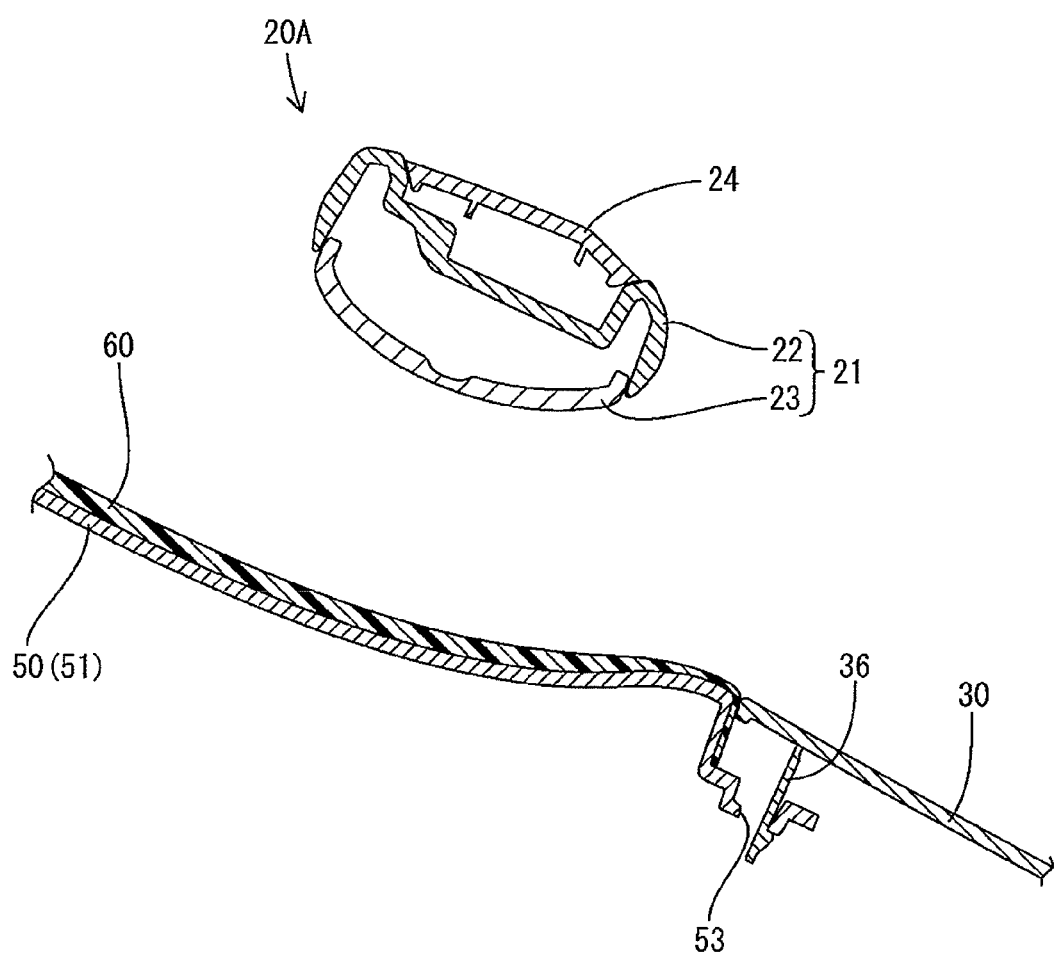
FIG. 7 is a cross-sectional view taken along line B-B in FIG. 5.
Figure 8:
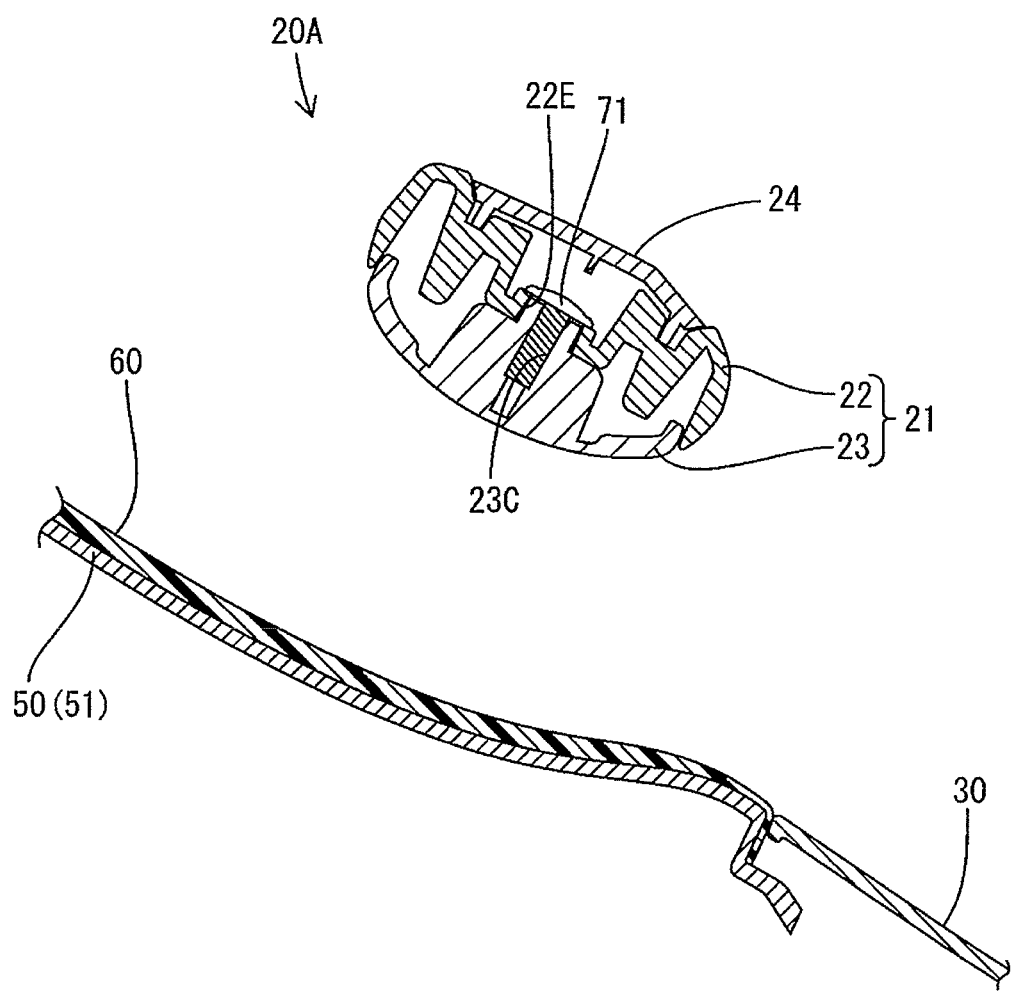
FIG. 8 is a cross-sectional view taken along line C-C in FIG. 5.

The mounting bosses 22A and 22B are inserted in the through holes 23A and 23B, respectively. The overlapping fixing portions 25 are inserted in the corresponding second overlapping insertion holes 26. As a result, the first divided section 22 and the second divided section 23 overlap each other (see FIGS. 4 to 6). As illustrated in FIG. 8, in about a middle area in a longitudinal direction of the grip portion 20A, a screw 71 is inserted in a screw insertion hole 22E of the first divided section 22 and then screwed into a screw hole 23C of the second divided section 23. As a result, the first divided section 22 and the second divided section 23 are fixed together with the screw. As illustrated in FIGS. 7 and 8, boundaries (or dividing areas) between the first divided section 22 and the second divided section 23 of the grip base 21 are located at lateral areas of the door grip 20 that are on the vehicle front side and the vehicle rear side. The lateral areas are less likely to be recognized when viewed from the vehicle interior side. Therefore, the appearance of the door grip 20 can be improved.

Figure 9:
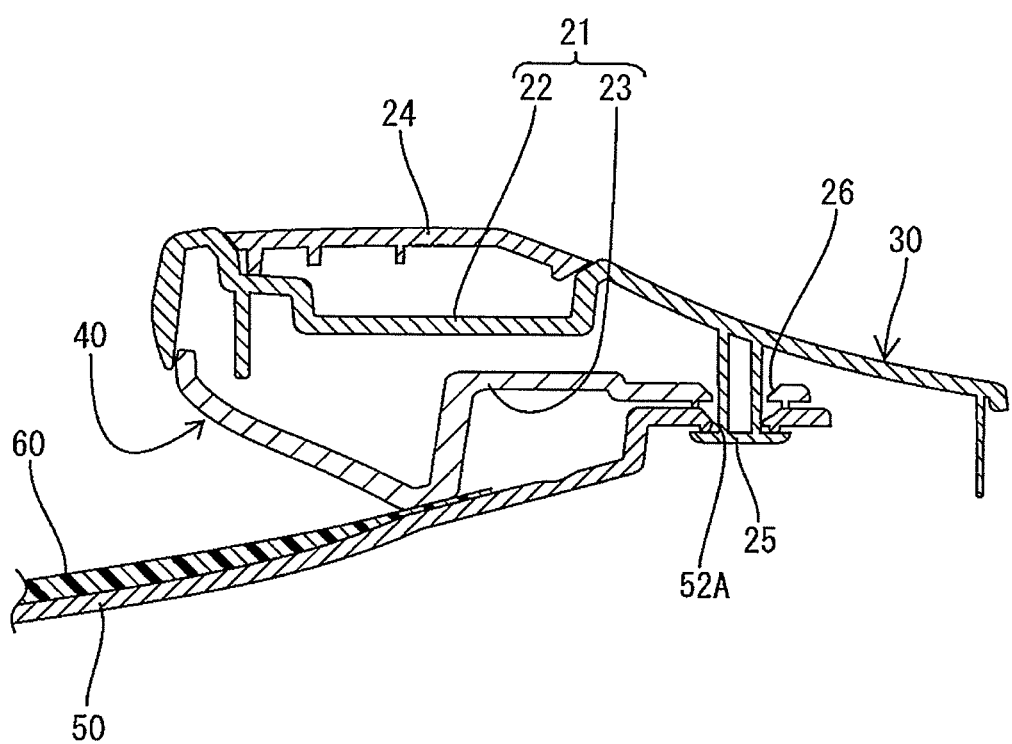
FIG. 9 is a cross-sectional view taken along line D-D in FIG. 5.

As illustrated in FIG. 9, in the base portions 20B of the door grip 21, the overlapping fixing portions 25 that are inserted in the second overlapping insertion holes 26 are further inserted in the first overlapping fixing portions 52A of the ornament 50. Then, distal ends of the overlapping fixing portions 25 are welded by ultrasonic welding or some other welding method. As a result, the front trim 30, the rear trim 40, and the ornament 50 are fixed together with overlapping one another. The front trim 30, the rear trim 40, and the ornament 50 are fixed together at several points in the respective base portions 20B of the door grip 20, and this improves rigidity of the base portions 20B.

As illustrated in FIG. 6, the grip cover 24 is attached to a vehicle interior surface of the grip base 21. More specifically, as illustrated in FIG. 2, the front trim 30 includes a cover attachment portion 38 that extends from the first divided section 22 to the upper portion of the front trim 30. The cover attachment portion 38 is arranged on a vehicle interior surface of the front trim 30 and recessed to the vehicle exterior side. The grip cover 24 is fitted in the cover attachment portion 38. Fixing locks 24A project from a vehicle exterior surface of the grip cover 24 opposite a design surface (the vehicle-interior-side surface) of the grip cover 24. On the other hand, fixing portions 38A that are holes are formed in areas of the cover attachment portion 38 corresponding to the fixing locks 24A. The fixing locks 24A are stopped by opening edges of the fixing portions 38A. Accordingly, the grip cover 24 is attached to the cover attachment portion 38 and the attached state is maintained.

The door grip 20 that is assembled to the door trim in the boundary portion of the front trim 30 and the rear trim 40 is fixed to a door inner panel, which is not illustrated. As illustrated in FIG. 6, the screws 70 that are inserted in the screw hole 22C of the mounting boss 22A and the screw hole 22D of the mounting boss 22B are screwed into mounting holes 72 of the door inner panel. Thus, the base portions 20B of the door grip 20 are fixed to the door inner panel, and a predetermined level of mount strength is ensured for the door grip 20 that is molded integrally with the front trim 30 and the rear trim 40.

As described above, according to the above embodiment, the door grip 20 can be formed using a part of each of the front trim 30 and the rear trim 40 while the front trim 30 and the rear trim 40 are provided for forming other part of the door trim 10. Therefore, the number of components can be reduced. Accordingly, exclusive dies for and exclusive steps of forming the door grip 20 are not required and thus the production efficiency is improved. Further, since the part of each of the front trim 30 and the rear trim 40 constitutes the door grip 20, steps of mounting the door grip 20 to the trims 30 and 40 may be omitted and thus the production efficiency is further improved.

The front trim 30 includes the mount section 31 for mounting a vehicle rear end portion of the front trim 30 to the mounting section 43 arranged in a vehicle front end portion of the rear trim 40 with the mount section 31 and the mounting section 43 overlapping each other. The mount section 31 includes the first divided section 22 and the mounting section 43 includes the second divided section 23. The door grip 20 is arranged in the boundary portion of the front trim 30 and the rear trim 40.

With this configuration, the door grip 20 can be configured by the mount section 31 and the mounting section 43 that are provided for assembling the front trim 30 and the rear trim 40. Further, the assembling of the front trim 30 to the rear trim 40 and the assembling of the first divided section 22 to the second divided section 23 can be performed with a common structure, and thus the configuration is simplified. Accordingly, the structure of dies for forming the trims 30 and 40 and steps of assembling the trims 30 and 40 can be simplified, and thereby the production efficiency is improved. In addition, since the door grip 20 is arranged in the boundary portion between the front trim 30 and the rear trim 40, the door trim 10 including the door grip 20 that extends along the dividing line 16 between the front trim 30 and the rear trim 40 and is excellent in design is obtained.

The door grip 20 is formed by assembling the divided sections including the first divided section 22 and the second divided section 23. The first divided section 22 constitutes a section of the door grip 20 on the vehicle interior side and the second divided section 23 constitutes a section of the door grip 20 on the vehicle exterior side. With this configuration, a vehicle exterior-side-surface of the second divided section 23 receives an external force directed to the vehicle interior side that is caused when an occupant grips the door grip. Therefore, the door grip 20 having great strength can be enhanced. In addition, the boundary between the first divided section 22 and the second divided section 23 are located in the lateral areas of the door grip 20 on the vehicle front side and the vehicle rear side, respectively. The lateral areas are less likely to be viewed from the vehicle-interior-side surface of door trim 10, and this improves appearance of the door trim.

The first divided section 22 includes the upper mounting boss 22A and the lower mounting boss 22B that project toward the door inner panel located on the vehicle exterior side relative to the first divided section 22. The second divided section 23 has the upper through hole 23A and the lower through hole 23B. After the mounting bosses 22A and 23B are passed through the corresponding through holes 23A and 23B, the mounting bosses 22A and 22B are fixed to the door inner panel. With this configuration, the door grip 20 including the first divided section 22 and the second divided section 23 is mounted to the door inner panel with a simple structure. Such a mounting structure is not exposed to the design-surface side and this improves appearance of the door trim.

The grip cover 24 is attached to the cover attachment portion 38 arranged in a surface of the first divided section 22 on the vehicle interior side. Namely, the grip cover 24 provided as a different member constitutes a designed portion of the door grip 20. The grip cover 24 that is a separate member is used as a designed portion of the door grip 20. Accordingly, even if the door grip is formed by the paired divided sections, the boundary between the first divided section 22 and the second divided section 23 or the attachment portion of the door grip 20 to the door inner panel is covered with the grip cover 24 from the vehicle interior side. This enhances the design of the door grip 20.

The ornament 50 is attached to the front trim 30 and the rear trim 40 and arranged on the vehicle exterior side relative to the first divided section 22 and the second divided section 23. The door grip 20 is formed by the first divided section 22 that is included in the front trim 30 as a part thereof and the second divided section 23 that is included in the rear trim 40 as a part thereof. The door grip 20 is divided into the vehicle interior section and the vehicle exterior section. Furthermore, each of the divided sections of the door grip is integrally molded with each of the front trim 30 and the rear trim 40 such that the die for molding each of the front trim 30 and the rear trim 40 is removed in the vehicle interior-exterior direction. Thus obtained door trim has a hole on the vehicle exterior side relative to the door grip 20. In other words, a member that covers the hole formed in the door trim and on the vehicle exterior side relative to the door grip 20 cannot be molded with the front trim 30 or the rear trim 40. The hole is covered with the ornament 50 that is an existing component. Therefore, the number of components is not necessary to be increased and an appearance of the door trim 10 is enhanced.

<Other Embodiments>

The present invention described herein is not limited to the above embodiment described in the above description and the drawings. The technology described herein may include the following embodiments.

(1) In the above embodiment, the door grip 20 is formed by the grip base 21 and the grip cover 24 including the first divided section 22 and the second divided section 23. However, the door grip may only include the grip base. With this configuration, the number of components further decreases and improvement in production efficiency is expected.

(2) In the above embodiment, the grip base 21 is formed by assembling the divided sections including the first divided section 22 and the second divided section 23. The first divided section 22 is the vehicle-interior-side portion of the grip base 21 and the second divided section 23 is the vehicle-exterior-side portion of the grip base 21. However, the grip base may be divided in the vehicle front-rear direction or may be divided into sections more than two, for example, four.

(3) In the above embodiment, the ornament 50 is arranged on the vehicle exterior side relative to the door grip 20. However, a member other than the ornament may be arranged on the vehicle exterior side relative to the door grip or the door trim may not necessarily include such an ornament. For example, the dies for molding the front trim and the rear trim may be removed in different directions from the above embodiment such that the first divided section and the second divided section of the door grip may be divided in a different direction from the above embodiment. Thus, a surface that is located on the vehicle-exterior-side of the door grip may be integrally formed with each of the trims.

(4) In the above embodiment, the first divided section 22 and the second divided section 23 that constitute the grip base 21 are included in the mount section 31 and the mounting section 43 where the front trim 30 and the rear trim 40 are assembled. However, the divided sections may be arranged separately from the mounting portions of the front trim and the rear trim. The door grip may not be necessarily arranged along the dividing line between the front trim and the rear trim and the door grip may be formed by using a part of each of the front trim and the rear trim. This decreases the number of the components and improves the production efficiency.

(5) In the above embodiment, the ornament 50 is covered with the skin 60 on its vehicular-interior-side surface. However, the ornament 50 may not be covered with the skin 60 and the main body of the ornament may form a design surface on the vehicle interior side.

EXPLANATION OF SYMBOLS

10: door trim, 20: door grip, 21: grip base, 22: first divided section 22A: upper mounting boss, 22B: lower mounting boss, 23: second divided section 23A: upper through hole, 23B: lower through hole, 24: grip cover, 30: front trim, 31: mount section, 32: mounting member, 40: rear trim, 41: mounting hole, 43: mounting section, 44: insertion hole, 50: ornament

The invention claimed is:

1. A door trim including a door grip, comprising:
a front trim to be arranged closer to a front side of a vehicle; and
a rear trim to be arranged closer to a rear side of the vehicle, wherein
the door grip includes a first divided section included in the front trim and the second divided section included in the rear trim assembled together,
either one of the first divided section and the second divided section is arranged on an interior side of the vehicle and the other one of the first divided section and the second divided section is arranged on an exterior side of the vehicle,
the door grip is formed by assembling the divided sections including the first divided section and the second divided section, the door grip is a hollow part having a handle-like shape,
the front trim includes a first hole and the first divided section having a band-like shape extends in an a vehicle rear portion of the front trim relative to the first hole,
the rear trim includes a second hole and the second divided section having a band-like shape extends in a vehicle front portion of the rear trim relative to the second hole,
the door trim further comprises an ornament attached to the front trim and the rear trim,
the ornament is arranged on the exterior side relative to the first divided section and the second divided section,
the ornament covers the first hole from the exterior side of the vehicle and includes an opposite surface that faces a vehicle exterior surface of the door grip, and
the ornament that continues from the opposite surface is fitted to the second hole.

2. The door trim according to claim 1, wherein assembly of the first divided section and the second divided section is complete when the front trim and the rear trim are assembled.

3. The door trim according to claim 1, wherein
the front trim further includes a mount section for mounting a vehicle rear end portion of the front trim to a mounting section arranged in a vehicle front end portion of the rear trim with the mount section and the mounting section overlapping each other,
the mount section includes the first divided section, and
the mounting section includes the second divided section, wherein
the door grip is arranged in a boundary portion between the front trim and the rear trim.

4. The door trim according to claim 3, wherein at least portions of the front trim and the rear trim in the boundary portion are in different colors from each other.

5. The door trim according to claim 1, wherein
the one of the first divided section and the second divided section arranged on the interior side of the vehicle includes a boss projecting toward a body of the vehicle, and
the other one of the first divided section and the second divided section arranged on the exterior side of the vehicle has a through hole through which the boss is passed, wherein
the boss passed through the through hole is fixed to the body of the vehicle.

6. The door trim according to claim 1, wherein the one of the first divided section and the second divided section arranged on the interior side of the vehicle further includes a grip cover attached to an interior side surface of the one of the first divided section and the second divided section arranged on the interior side.

7. The door trim according to claim 1, further comprising an ornament attached to the front trim and the rear trim and arranged on the exterior side relative to the first divided section and the second divided section.

8. The door trim according to claim 1, further comprising an impact absorbing member attached to vehicle exterior surfaces of the front trim and the rear trim, the impact absorbing member extending over the front trim and the rear trim.

9. The door trim according to claim 8, wherein the impact absorbing member includes a front mounting section attached to the front trim and a rear mounting section attached to the rear trim.

10. The door trim according to claim 1, further comprising:
a front ornament fixing portion and an ornament lock to be attached to the ornament, and the front ornament fixing portion and the ornament lock are arranged on an opening edge portion of the first hole on the vehicle front side; and
a plurality of rear ornament fixing portions to be attached to the ornament and arranged along an opening edge of the second hole, and each of the rear ornament fixing portions has a post-like shape.

11. The door trim according to claim 1, further comprising an armrest projecting to the interior side of the vehicle and extending over a front-rear direction of the vehicle, wherein
the door grip extends over about a middle portion of the armrest, the middle portion being located at about the middle of the armrest in the vehicle front-rear direction.

12. The door trim according to claim 3, wherein the boundary portion has a shape of a substantially straight and inclined line that extends from a midpoint of an upper portion of the door trim in the vehicle front-rear direction to a rear portion of a lower portion of the door trim in the vehicle front-rear direction.

13. The door trim according to claim 1, wherein in a base of the door grip,
the first divided section includes an overlapping fixing portion projecting therefrom,
the second divided section includes a second overlapping insertion hole in which the overlapping fixing portion is inserted,
the ornament includes a first overlapping insertion hole in which the overlapping fixing portion is inserted, and
the overlapping fixing portion is inserted in the second overlapping insertion hole and further inserted in the first overlapping insertion hole of the ornament such that the front trim, the rear trim and the ornament are fixed together with overlapping one another.

* * * * *